(12) United States Patent
Chiou et al.

(10) Patent No.: US 9,571,486 B2
(45) Date of Patent: Feb. 14, 2017

(54) SYSTEM AND METHOD FOR AUTHENTICATION

(71) Applicants: WATER START INTERNATIONAL INDUSTRY CO. LTD, Taipei (TW); Edward Hsiao, Taipei (TW)

(72) Inventors: Michelle Chiou, Taipei (TW); Edward Hsiao, Taipei (TW); Rose Chiou, Taipei (TW)

(73) Assignee: PEOPLE'S LTD, Belize (BZ)

( * ) Notice: Subject to any disclaimer, the term of this patent is extended or adjusted under 35 U.S.C. 154(b) by 0 days.

(21) Appl. No.: 14/327,405

(22) Filed: Jul. 9, 2014

(65) Prior Publication Data

US 2015/0207788 A1    Jul. 23, 2015

(30) Foreign Application Priority Data

Jan. 21, 2014  (TW) .............................. 103102081 A

(51) Int. Cl.
| | | |
|---|---|---|
| H04L 29/06 | (2006.01) | |
| G06F 21/36 | (2013.01) | |
| H04W 12/06 | (2009.01) | |
| H04L 29/08 | (2006.01) | |

(52) U.S. Cl.
CPC ............ *H04L 63/083* (2013.01); *G06F 21/36* (2013.01); *H04W 12/06* (2013.01); *H04L 67/02* (2013.01)

(58) Field of Classification Search
CPC .......... G06F 21/36; G06F 21/45; G06F 21/46; G06F 2221/2143; G06F 2221/2101; G06F 3/0484; G06F 17/30657; G06F 21/31; H04L 9/3226; H04L 2209/56; H04L 63/08; H04L 63/083; H04L 63/0815; H04L 63/0853; H04L 9/32; H04W 12/06

USPC ......................................................... 726/6, 7
See application file for complete search history.

(56) References Cited

U.S. PATENT DOCUMENTS

| | | | |
|---|---|---|---|
| 2004/0153649 A1* | 8/2004 | Rhoads et al. ................. 713/176 |
| 2008/0201578 A1* | 8/2008 | Drake ..................... G06F 21/36 713/172 |
| 2008/0250481 A1* | 10/2008 | Beck ..................... H04L 63/083 726/6 |
| 2013/0167225 A1* | 6/2013 | Sanft ....................... G06F 21/36 726/19 |
| 2013/0198079 A1* | 8/2013 | Mattes et al. ................... 705/44 |
| 2013/0297507 A1* | 11/2013 | Mechaley, Jr. ....... H04W 12/06 705/44 |
| 2014/0053254 A1* | 2/2014 | Sun ........................ G06F 21/36 726/7 |
| 2014/0090035 A1* | 3/2014 | Kodama ................. G06F 21/31 726/6 |
| 2015/0012988 A1* | 1/2015 | Jeng et al. ........................ 726/7 |
| 2015/0095643 A1* | 4/2015 | Adams ........................... 713/165 |

(Continued)

*Primary Examiner* — Don Zhao
(74) *Attorney, Agent, or Firm* — Muncy, Geissler, Olds & Lowe, P.C.

(57) ABSTRACT

The purpose of the invention is to provide a password with lower cost but higher safety used in an authentication system, and users may choose one specific picture as a password to register or log in the internet. Because the data string of the picture is too big for general crackers to alter, break and steal the data string of the picture with currently available cracked methods. The present invention of the authentication system also includes a communication device and a cloud server to provide users to register or log in the system.

7 Claims, 3 Drawing Sheets

(56) References Cited

U.S. PATENT DOCUMENTS

2015/0178490 A1* 6/2015 Tamboly ............... G06F 21/46
　　　　　　　　　　　　　　　　　　　726/4

* cited by examiner

Figure 2

202 Choosing and uploading a first photo by a user to a first memory of a cloud service or a communication device (such as phones) as a first password, and the first photo is dragged or indicated by HTML5 to a user interface generator for registering.

204 Performing the user interface generator and transmitting the first photo to a cloud server through a connection of one of a first and second wireless transmission module and a communication interface, and the first photo is transmitted to a process module of the cloud server, and the process module converts the first photo to a data string.

206 The data string is transmitted to a encryption module for encrypting.

208 A encrypted data string is finally stored in the database.

Figure 3

302 Inputting a first photo to a user interface generator of a communication device for login.

304 Performing the user interface generator and transmitting the first photo to a cloud server through a connection of one of a first and second wireless transmission module and a communication interface, and the first photo is transmitted to a process module of the cloud server, and the process module converts the first photo to a data string.

306 The data string is transmitted to a encryption module for encrypting.

308 Transmitting an encrypted data string to a database of a cloud server, then comparing the sequence of the data string of the photo submitted by the user with the sequence of the related data string of the photo in the database.

310 if the result of step 308 is not completely the same, the result will be sent back to the user interface generator to notice the user there still have several times to log in, indicating there is an failure in authentication using the photo submitted by the user.

312 Once getting incorrect results by logging in several times, the user account will be locked.

314 The user may receive a provisional photo as a password through the communication device for re-login through the email boxes or phones.

316 The user may use a new photo instead of the provisional photo after logging in.

SYSTEM AND METHOD FOR AUTHENTICATION

FIELD OF THE INVENTION

The present invention relates to a system and method for authentication; more particularly, the present invention relates to a system and method for authentication that is provided for identifying the user status on the internet.

BACKGROUND OF THE INVENTION

Currently most authentication methods of authentication systems on the market still focus on accounts and passwords. Despite the convenience of such mechanism, the security is rather poor. Hackers may obtain or crack passwords, especially for passwords easily guessed or remembered, through a variety of methods. Password strength is also a big issue for passwords itself. The higher safety password which is relatively not easy to be remembered may still have high possibility that cannot reach hacker prevention and instead unable the users to log in. Each network or system needs passwords, some systems may request users to change their passwords regularly and causing users often forget their passwords. Therefore, many people still choose to use passwords easy to remember, but by contrast, the password safety is greatly declined.

Even if the abovementioned password strength is high enough, it can not prevent completely from hacker's violent invasion and scanning crack. For the safety of the clients, most of the financial websites and game websites will use additional authentication tools. The authentication tool is not convenient to use; due to it is usually an extra hardware, it is even more inconvenient to carry. It will bother user for unable to log in the system if the authentication tool is not carried or lost. In addition, to provide users with authentication tools, it will cost the business owners a certain amount of expense in developing the authentication tool. However, the most inconvenient point is that the authentication tools are exclusive technologies and there is no shared or united method for authentication; therefore, the consumers may need to carry many authentication tools at the same time. Although recently Google also provided a kind of portable USB hardware for authentication, it still faces the above problem that is not convenient to be carried and lost easily.

SUMMARY OF THE INVENTION

The purpose of the invention is to provide a lower cost and higher safety password for the authentication system, users may choose a certain photo as a password for use of registering and logging in a network. Because the size of the data string of the certain photo using as the password is thousands to tens of thousands of times than a general numeric password or a character password. Therefore, it is so hard to crack the photo of the invention used as a password by generally known methods of the brute force and the scanning crack, the user doesn't need to remember a long series of the character password or the numeric password. The main purpose of the invention is to provide general users for the authentication system easy to use and remember.

Another purpose of the invention is to prevent users from safety doubts of sharing photos for registering or login use to the general community websites. Because the community website itself processes the photo while the photo is shared on the community website such as Facebook, so even if downloading the photo from the community website, the format and size of the downloaded photo will be also not the same as the original one. Therefore, while a stealer wants to use the photo downloaded from the community website for login, the cloud server of the invention will compare completely, such as comparing the data string size of the files. Even the size of the stolen photo is a little difference with the original one, once the photos are unable to match up, the cloud server still refuses the login used by the stealer. Hence, the authentication system of the invention should be able to reduce the possibility of impersonation photos.

In a first aspect of the invention, both ends of the invention are a communication device and a cloud server, wherein the communication device (such as mobiles, computers etc.) comprises: a first memory, such as cloud storages (Microsoft SkyDrive®, Google Drive® and Apple iTunes®) or general hard disks coupled with a first processor, including CPU, buffer, multiplexer and other process elements, storing a first photo; a user interface generator coupled with the first processor and the first memory for receiving the first photo provided by the first memory; a first and second wireless (including a Wi-Fi module and a RF module) transmission module coupled with the first processor for transmitting the first photo; a display coupled with the first processor to display a scene of the user interface generator; and a cloud server comprises a second processor and a communication interface, after one of the first and second wireless transmission module is connected with the communication interface, and the first photo is transmitted to the cloud server, wherein the cloud server further comprising: a process module coupled with the second processor to convert the first photo to a data string; a encryption module coupled with the second processor may encrypt the data string such as adding a hash into the data string; a database coupled with the second processor may store a encrypted data string.

In a second aspect of the invention, the invention discloses a registering method for authentication. The procedure of the method comprises: choosing a photo as a first photo in a first memory such as cloud storages (Microsoft SkyDrive®, Google Drive® and Apple iTunes®) or general hard disks (such as mobiles and USB flash drives) upon registering in the, and the first photo is as the first password and dragged or indicated by HTML5 to a user interface generator for registering; performing the user interface generator and the first photo is transmitted to a cloud server through a connection of one of a first and second wireless transmission module and a communication interface, wherein the communication device may be a mobile and a computer device, the user interface generator also may receive a second photo provided by the first memory as a second password, and the format of the first and second photos is including, but not limited to JEPG and TIF. The user interface generator further includes a personal identification number (PIN).

While the first photo is transmitted to the process module of the cloud server, the process module converts the first photo to a data string; then the data string is transmitted to an encryption module for encrypting such as adding a hash; an encrypted data string is finally stored in the database.

In a third aspect of the invention, the invention provides a authentication system for authentication, both ends of the invention are a communication device and a cloud server, wherein the communication device (such as mobile, computer etc.) comprises a first memory, such as cloud storages (Microsoft SkyDrive, Google Drive and Apple iTune) or general hard disks coupled with a first processor, including CPU, buffer, multiplexer and other process elements, stores a first photo; a user interface generator coupled with the first processor and the first memory for receiving the first photo provided by the first memory; a first and second wireless transmission module (including a wifi module and a RF module) coupled with the first processor for transmitting the first photo; a display coupled with the first processor to display a scene of the user interface generator; and a cloud server comprises a second processor (includes CPU, buffer, multiplexer and other process elements) and a communication interface, after one of the first and second wireless transmission module is connected with the communication interface, and the first photo is transmitted to the cloud server, wherein the cloud server further comprises: a process module coupled with the second processor to convert the first photo to a data string; a encryption module coupled with the second processor may encrypt the data string such as adding a hash into the data string; a database coupled with the second processor may store an encrypted data string. the database further comprises a photo verification means, where it may compare a data string of a photo submitted by a user with a related data string of a photo in the database and verify if the data string of the photo submitted by a user is completely correct.

In a fourth aspect of the invention, the invention provides a login method for authentication, the procedure of the method comprises: upon logging in, the user who have been registered completely inputs the first photo to a user interface generator of a communication device for login; performing the user interface generator and transmitting the first photo to a cloud server through a connection of one of a first and second wireless transmission module and a communication interface prior to transmitting the first photo to a process module of the cloud server for converting the first photo to a data string; the data string is transmitted to an encryption module for encrypting such as adding a hash into the data string; transmitting an encrypted data string to a database of a cloud server, the cloud server contains a photo verification means, comparing the data string of the photo submitted by the user with the related data string of the photo in the database and verify if the photo submitted by the user is completely correct; if the result via comparing is almost the same or most of the same, the cloud server may consider that the login is failed and send back a message to the user interface generator to notice the user.

In a fifth aspect of the invention, the authentication system of the invention actively provides a certain photo from the cloud server as a password for the user for registering use. The cloud server further comprises a photo producing module. The photo producing module coupled with the second processor provides a third photo. In case the cloud server authorizes the user to register, the photo producing module produces and transmits the third photo to the user's e-mail box or mobile through the communication interface coupled with the second processor, the user may utilize the third photo as the password to input to the user interface generator, and the third photo is transmitted to the process module of the cloud server and converted to the data string after one of the first and second wireless transmission module is connected with the communication interface, then the data string is transferred to the encryption module. The encryption module further encrypts the data string such as adding a hash into the data string. The user account and the encrypted character data finally are stored in the database coupled with the encryption module and the login is complete. After completing the login, the user may choose a fourth photo as a new password to replace the third photo provided by the cloud server.

In case failing to log in several times by the user, the user account will be locked and the user may transmit a distress signal to the cloud server, the cloud server may place a fifth photo used to unlock in the database and notice the user to use the fifth photo as a fifth password to unlock the user account. After the user log in the system, the user may re-set a sixth photo as a sixth password used to re-register.

In addition, the authentication system of the invention may be used in the communication platform including but not limited to general community exchange platforms, financial websites and game websites etc. The authentication system of the invention doesn't need to develop authentication tools to reduce costs and carry authentication tools.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 1 illustrates an embodiment of an authentication system for registering and logging in.

FIG. 2 is an illustration of an embodiment of a login method for an authentication system.

FIG. 3 is an illustration of an embodiment of a registering and verifying method for an authentication system.

DETAILED DESCRIPTION OF THE PRESENT INVENTION

Figure 1:
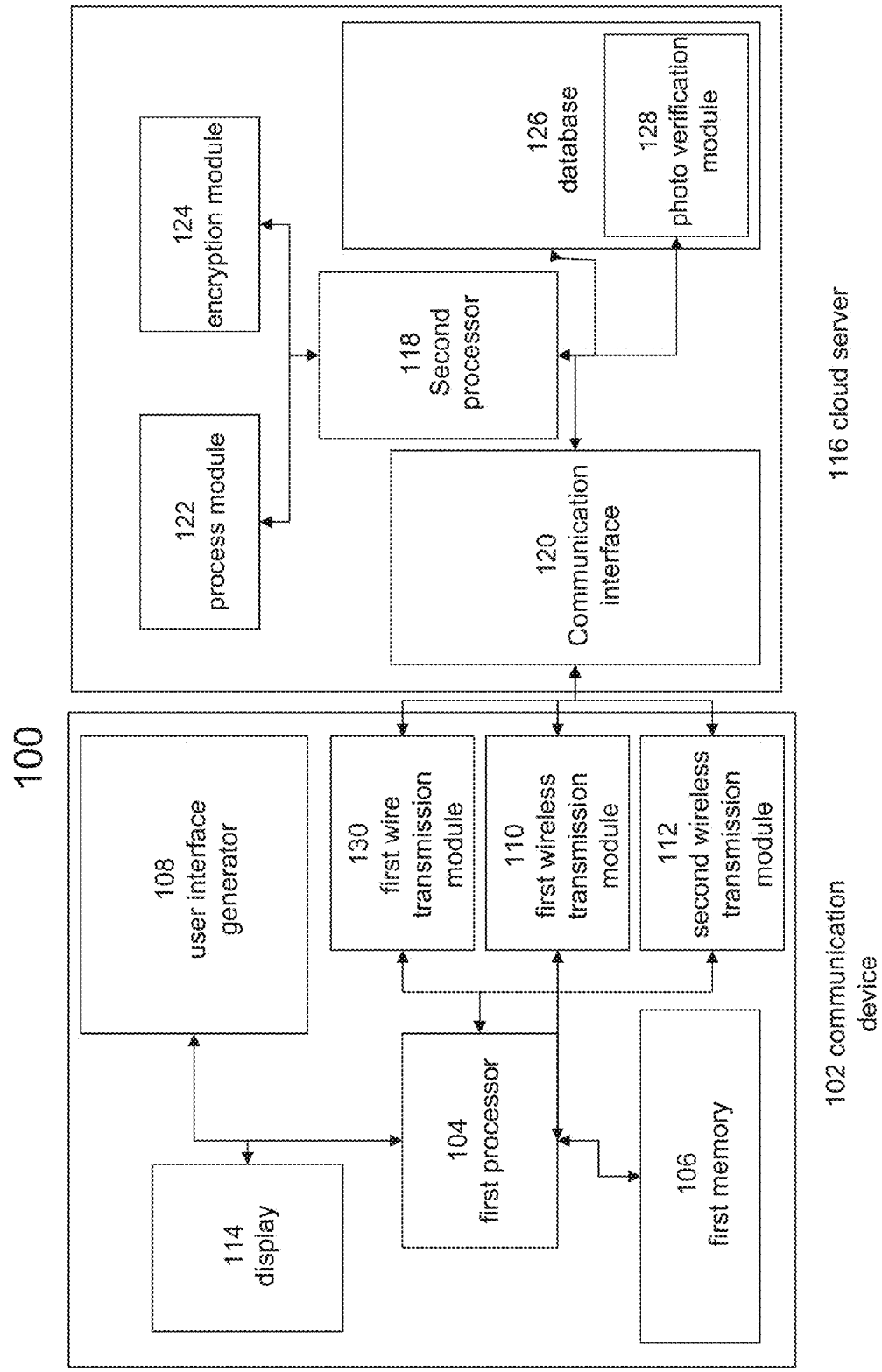

Some sample embodiments of the invention will now be described in greater detail. Nevertheless, it should be recognized that the present invention can be practiced in a wide range of other embodiments besides those explicitly described, and the scope of the present invention is expressly not limited expect as specified in the accompanying claims.

As shown in FIG. 1, it is illustrated as a block diagram of a basic structure and its application structure of an authentication system 100. The embodiment of the authentication system 100 may include a communication device 102 and a cloud server, wherein the communication device comprises: a first processor 104, a first memory, a user interface generator 108, a first 110 and second 112 wireless transmission module and a display 114; the cloud server 116 comprises: a second processor 118, a communication interface 120, a process module 122, an encryption module 124 and a database 126. Wireless transmission module is a physical PCB (printed circuit board) with proper broadcaster transmitting signals in the authentication system 100 and receiver receiving signals from the other calculating device via electromagnetic wave. The transmission of wireless transmission module shall be accomplished without physical connection between the communication device 102 and the cloud server. The type of broadcaster can be determined by type of electromagnetic wave used in transmission. For example, if a person skilled in this art wishes to transmit the signal via radio frequency, wireless transmission module with known antenna can be chosen. If the person skilled in this art wishes to transmit the signal via IR, wireless transmission module with known infrared light emitting diode can be chosen. Examples of wireless transmission module shall include but not be limited to any access point, transmitter, receiver or broadcasting device using IR, radio frequency, Wi-Fi as Bluetooth as their transmission protocol.

Referring to FIG. 1, upon registering in the communication device (such as phones, computers etc.), the user chooses a photo as a first photo in the first memory (such as Microsoft SkyDrive®, Google Drive® and Apple iTunes®) or general hard disks (such as mobiles and USB flash drives), and the first photo is as a first password and dragged or indicated to a user interface generator for registering; performing the user interface generator and transmitting the first photo to a cloud server through a connection of one of a first and second wireless transmission module and a communication interface. While the first photo is submitted in the cloud server, the process module may immediately convert the first photo to a data string, then the encryption module in the system encrypts the data string for protection, finally the encrypted data string is stored in the database.

The user interface generator transmits the first photo to the cloud server via connecting completely a first wire transmission module with the communication interface.

In some embodiments, the user interface generator further comprises a simple personal identification number (PIN) module to raise the standard of authentication while the user logs in the system.

In one embodiment, a second photo is as a second password and dragged or indicated from the first memory to a user interface generator for registering to increase required photos upon the user logs in the system. In other embodiments, the user interface generator further comprises a personal identification number (PIN) module provided for the user to enter the number at the same time.

In some embodiments, the user may decide if choosing the second photo and/or more photos as multiple passwords for registering use to increase the safety of the system after inputting the first photo as the first password to the user interface generator upon registering.

In one embodiment, the photo chosen from a cloud service (such as Microsoft Sky Drive®, Google Drive® and Apple iTunes®) or a communication device (such as phones, USB flash drives etc.) may be JEPG and TIF format etc.

FIG. 2 is an illustration of an embodiment of a registering method for authentication. The steps of the registering method of the invention for authentication are described as follows.

As shown in a step 202, the user chooses a first photo (including, but not limited to JEPG and TIF format etc.) in a first memory of a cloud service (such as Microsoft SkyDrive®, Google Drive® and Apple iTunes®) or a communication device (such as phones) as a first password, and the first photo is dragged or indicated to a user interface generator for registering.

As shown in a step 204, the user performs the user interface generator and transmitting the first photo to a cloud server through a connection of one of a first and second wireless transmission module and a communication interface, and the first photo is transmitted to a process module of the cloud server, and the process module converts the first photo to a data string.

As shown in a step 206, the data string is transmitted to an encryption module for encrypting.

As shown in a step 208, finally an encrypted data string is stored in the database.

In one embodiment, if the user have chosen the first photo as the first password and registered according to the said steps, the user must use the first password as the first password to log in upon intending to re-log in hereafter. The source of the photo used is acquired from a cloud service (such as Microsoft SkyDrive®, Google Drive® and Apple iTunes®) or a mobile device (such as phones, USB flash drives etc.) or a general computer memory.

FIG. 2 is a typically block diagram of a registering method for authentication and may perform, for example, such one or more operations of this illustration and explain how the system authenticates the user. In one embodiment, the embodiment of the authentication system may comprise a communication device and a cloud server, wherein the communication device includes a first processor, a first memory, a user interface generator, a first and second wireless transmission module and a display; the cloud server includes a second processor 118, a communication interface 120, a process module, a encryption module and a database, and the database also includes photo verification means 128.

In one embodiment, referring to the login and authentication method of the authentication system in FIG. 3, both of the system of the invention may be a communication device and a cloud server, wherein the communication device (such as phones, computers etc.) comprises: a first memory, such as cloud storages (Microsoft SkyDrive, Google Drive and Apple iTune) or general hard disks coupled with a first processor, including CPU, buffer, multiplexer and other process elements, stores a first photo; a user interface generator coupled with the first processor and the first memory for receiving the first photo provided by the first memory; a first and second wireless (including a wifi module and a RF module) transmission module coupled with the first processor for transmitting the first photo; a display coupled with the first processor to display a scene of the user interface generator; and a cloud server comprises a second processor and a communication interface, after one of the first and second wireless transmission module is connected with the communication interface, and the first photo is transmitted to the cloud server, wherein the cloud server further comprises: a process module coupled with the second processor converts the first photo to a data string; a encryption module coupled with the second processor may encrypt the data string such as adding a hash into the data string; a database coupled with the second processor may store an encrypted data string. The database includes a photo verification means 128, comparing a data string of a photo submitted by a user with a related data string of a photo in the database and verify if the data string of the photo submitted by a user is completely correct.

In one embodiment, the encryption method of the encryption module is to add a hash into the data string of the photo, the data string of the photo will do not be arbitrarily modified and changed. In addition, the format of the photo chosen to log in is including, but not limited to JEPG and TIF files etc.

As illustrated in FIG. 3, while the user who has been registered would like to log in and authenticate, the invention provides embodiments of steps 302-316 of the login and authentication method for authentication, which the login and authentication steps are illustrated as follows.

As shown in a step 302, the user inputs a first photo to a user interface generator of a communication device for login.

As shown in a step 304, the user performs the user interface generator and transmitting the first photo to a cloud server through a connection of one of a first and second wireless transmission module and a communication interface, and the first photo is transmitted to a process module of the cloud server, and the process module converts the first photo to a data string.

As shown in a step 306, the data string is transmitted to an encryption module for encrypting.

As shown in a step 308, transmitting an encrypted data string to a database of a cloud server for verifying the encrypted data string with photo verification means. The photo verification means are to compare the sequence of the data string of the photo submitted by the user with the sequence of the related data string of the photo in the database to see if the both sequences are completely the same. If the both sequences are not completely the same, the cloud server will proceed to step 310.

As shown in a step 310, if the result of step 308 is not completely the same, in other words, the both sequences are not completely matched, the result will be sent back to the user interface generator to notice a user and inform the user there still have several times to log in, indicating there is an failure in authentication using the photo submitted by the user.

As shown in a step 312, once getting incorrect results by logging in several times, the user account will be locked.

As shown in a step 314, the user may receive a provisional photo as a password through the communication device for re-login through the email boxes or phones.

As shown in a step 316, the user may use a new photo instead of the provisional photo after logging in.

In the step 304, wherein the user interface generator transmits the first photo to the cloud server after connecting completely a first wire transmission module 130 with the communication interface. The communication device may be phones, computers etc.

In some embodiments, the photo verification means also could be independent of the database and may decode the encrypted data string in the database and compare the data string of the photo submitted by the user with a related data string of the photo in the database and verify if the data string of the photo submitted by the user is completely correct.

In some embodiments, the method of the photo verification means is to verify and compare if the size of the data string of the photo submitted by a user is completely the same as the original data string previously registered and stored in the database. If the comparison result is almost the same or most of the same, the photo verification means still considers that the photo is not correct and sends back the login failure of the message to the user interface generator of the communication device.

In some embodiments, the authentication system of the invention actively provides a third photo as a third password for the user for registering use from the cloud server. In one embodiment, the cloud server further includes a photo generation module. If the cloud server authorizes the user to register, the photo generator produces the third photo to the user's communication device through the network and the user may use the third photo as the third password to log in. While the third photo is converted to the data string through the process module; the encryption module may encrypt the data string of the third photo for protection and the data string of the third photo cannot be changed; the encrypted data string finally is stored in the database and the login is complete. After completing the login, the user may re-set a fourth photo as a fourth password.

In some embodiments, if the user forgets the first password or the user account has not yet been unlocked, the user may also acquire a certification and receive a fifth photo from the cloud server through the email box or the phone. The user uses the fifth photo as a provisional fifth password to log in. After logging in, the user may reset a sixth photo as a sixth password for re-login hereafter.

Many of the methods are described in their most basic form, but processes may be added to or deleted from any of the methods and information may be added or subtracted from any of the described messages without departing from the basic scope of the present invention. It may be apparent to those skilled in the art that many further modifications and adaptations may be made. The particular embodiments are not provided to limit the invention but to illustrate it.

The invention claimed is:

1. A system for authentication comprising:
a communication device including:
a first processor;
a first memory electrically coupled with the first processor for storing a first photo, wherein the first photo is chosen by a user of the communication device and is uploaded by the user to the first memory;
a user interface generator electrically coupled with the first processor and the first memory for receiving the first photo provided by the first memory;
a first and a second wireless transmission interfaces electrically coupled with the first processor for transmitting the first photo;
a display electrically coupled with the first processor to display a scene of the user interface generator; and
a cloud server including:
a second processor;
a communication interface, after the communication interface is electrically connected with one of the first and second wireless transmission interfaces, transmitting the first photo to the cloud server; and
a database electrically coupled with the second processor to store the encrypted data string of the first photo;
wherein the cloud server converts the first photo to a data string,
wherein the cloud server encrypts the data string of the first photo, and
wherein the cloud server verifies the encrypted data string of the first photo with a second photo submitted by a user from an authentication login.

2. The system of claim 1, wherein the user interface generator receives the second photo provided by the first memory.

3. The system of claim 1, wherein the user interface generator further includes a personal identification number (PIN).

4. The system of claim 1, wherein the format of the first photo and the second photo is JEPG.

5. The system of claim 1, wherein the cloud server adds a hash into the data string when encrypting the data string.

6. The system of claim 1, wherein the first photo is from a cloud storage or a mobile device.

7. The system of claim 1, wherein the communication device includes a first wire transmission interface coupled with the first processor to transmit the first photo.

* * * * *